July 24, 1962 A. C. CHRISTENSEN, SR., ET AL 3,045,298
METHOD AND APPARATUS FOR SHELL MOLDING
Filed Sept. 28, 1959 5 Sheets-Sheet 1
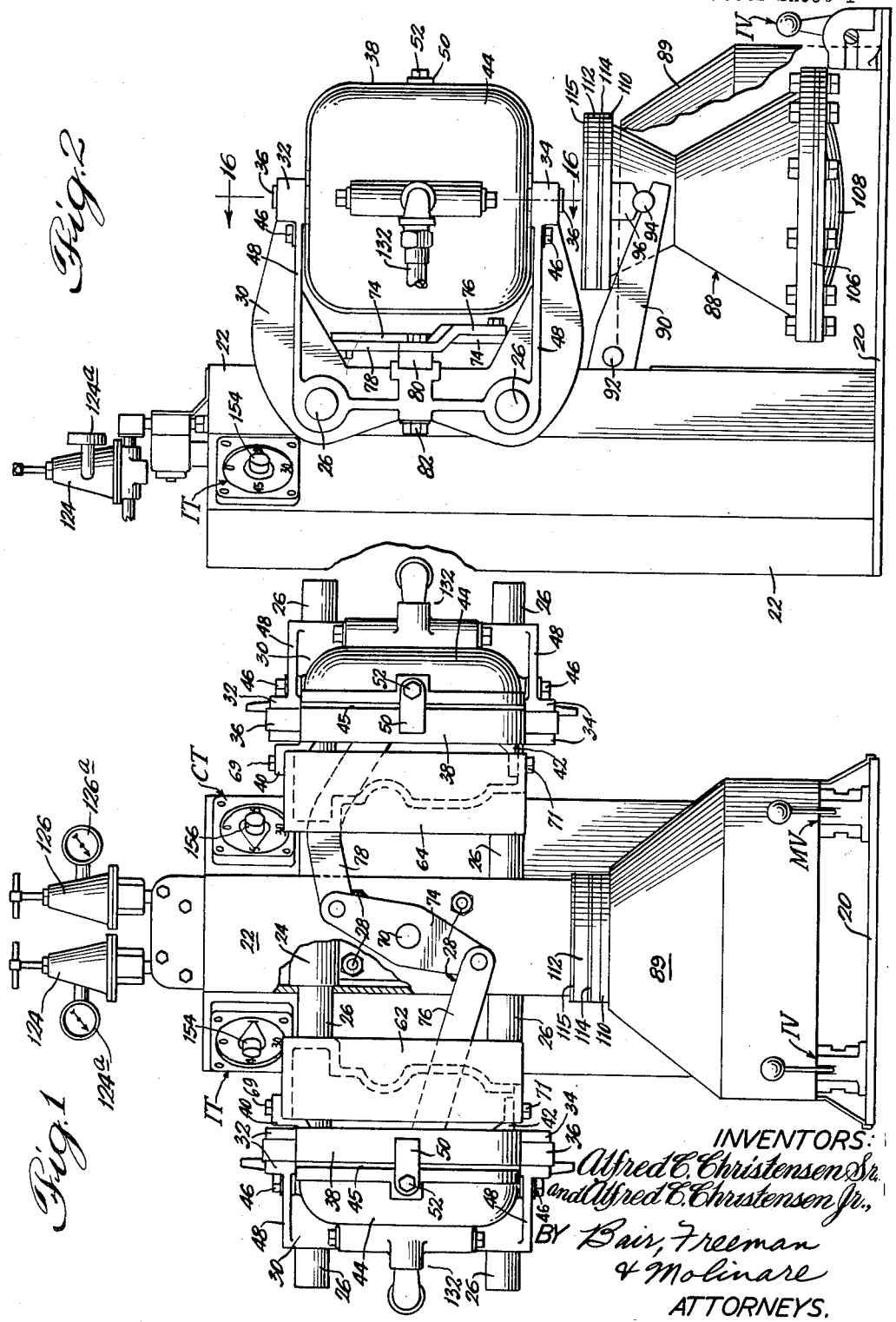
INVENTORS:
Alfred C. Christensen Sr.
and Alfred C. Christensen Jr.,
BY Bair, Freeman
& Molinare
ATTORNEYS.

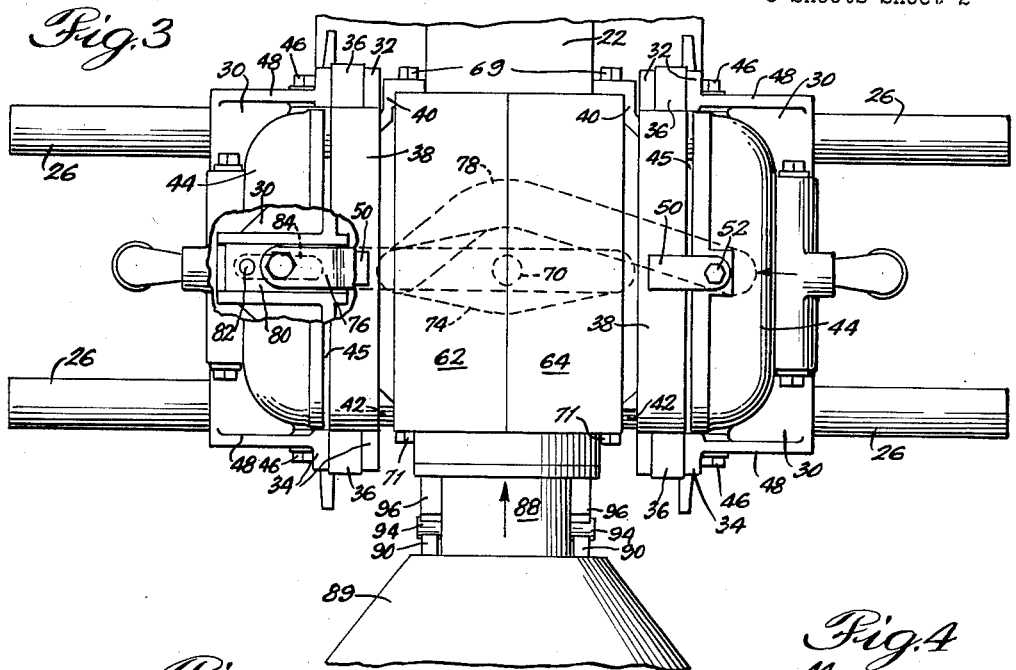

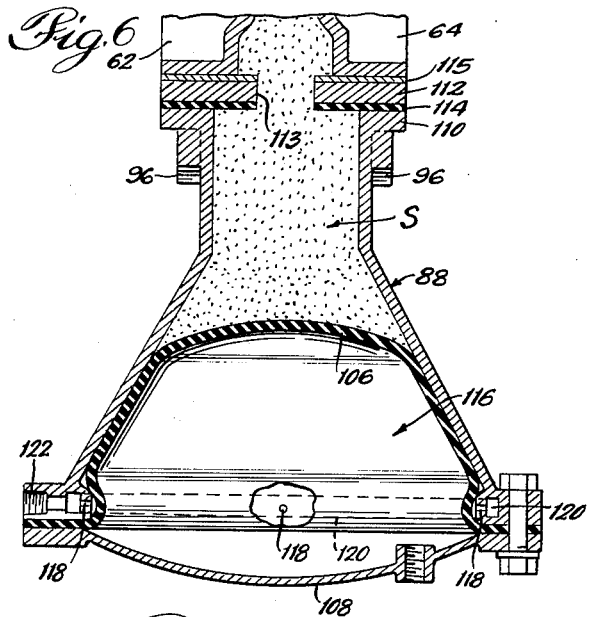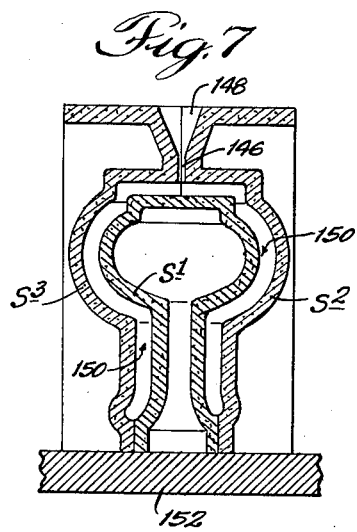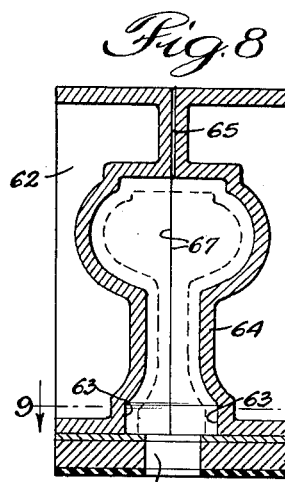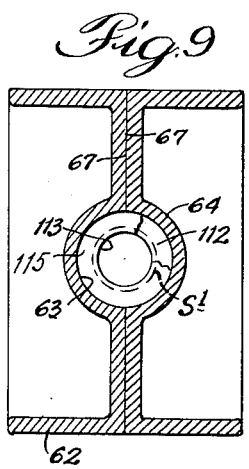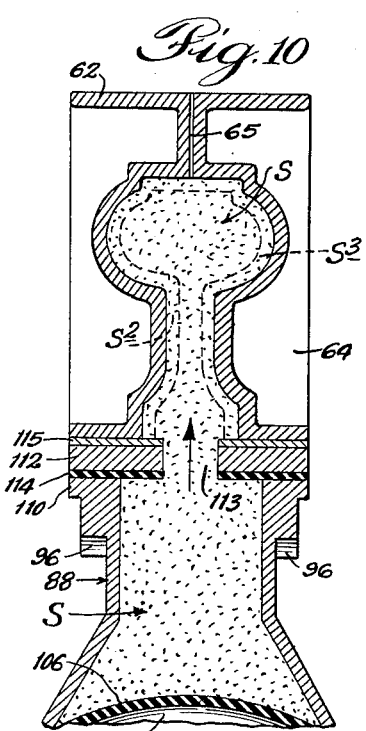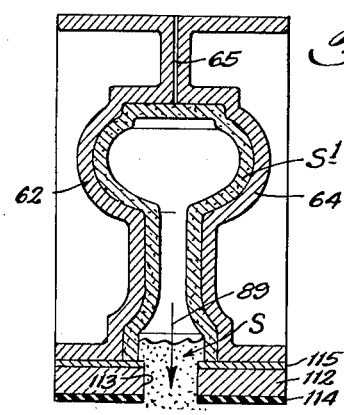

July 24, 1962  A. C. CHRISTENSEN, SR., ET AL  3,045,298
METHOD AND APPARATUS FOR SHELL MOLDING
Filed Sept. 28, 1959  5 Sheets-Sheet 4
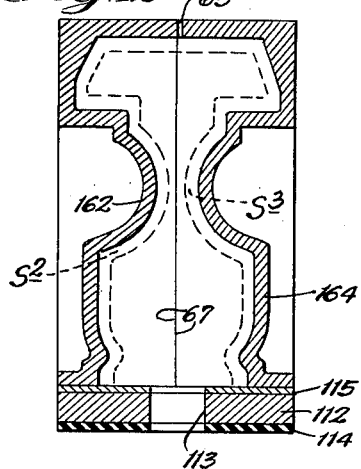
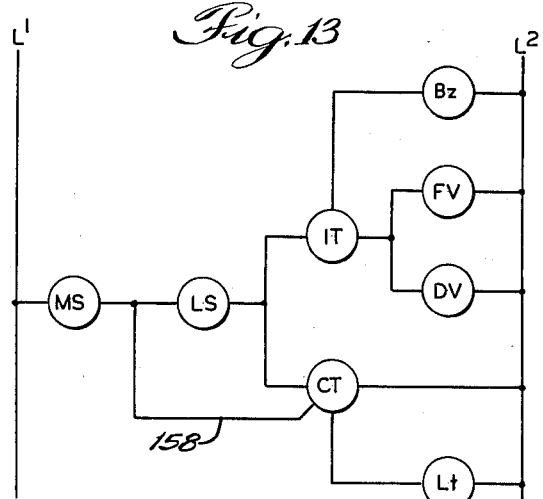
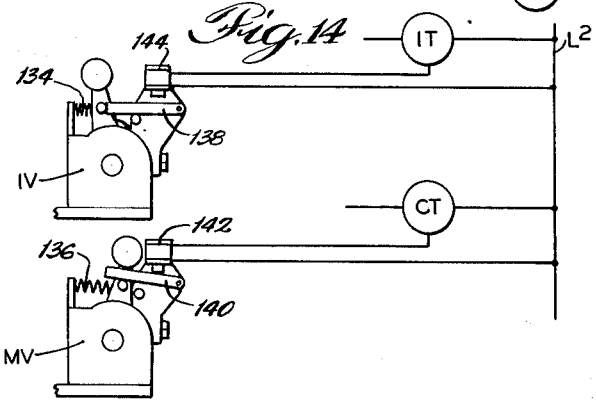
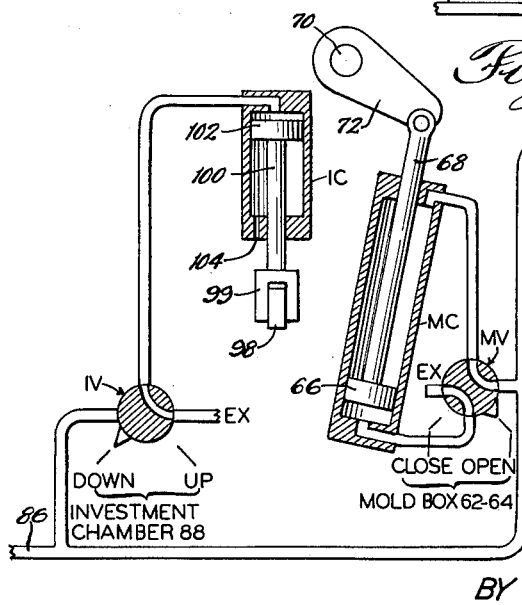
INVENTORS:
Alfred C. Christensen Sr.
and Alfred C. Christensen Jr.,
Bair, Freeman & Molinare
BY
ATTORNEYS.

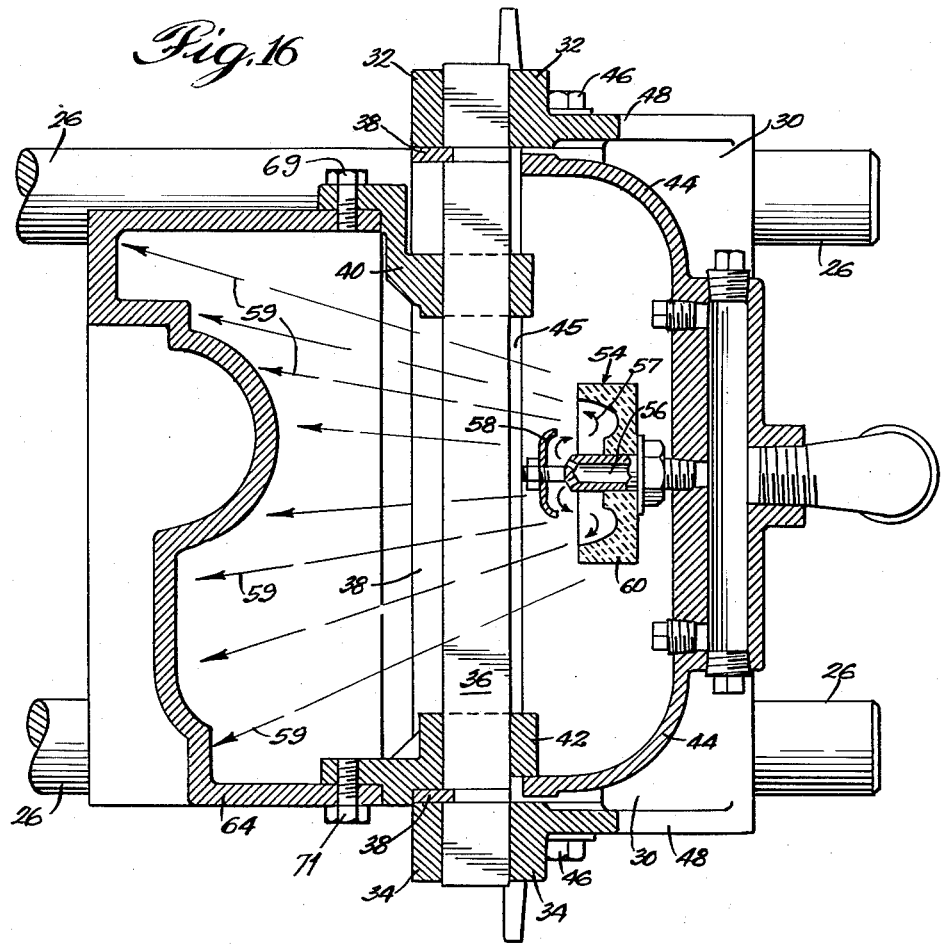

United States Patent Office 3,045,298
Patented July 24, 1962

3,045,298
METHOD AND APPARATUS FOR
SHELL MOLDING
Alfred C. Christensen, Sr., 9205 S. Marshfield Ave., Chicago 20, Ill., and Alfred C. Christensen, Jr., 5 Oak Lane, Park Forest, Ill.
Filed Sept. 28, 1959, Ser. No. 842,763
7 Claims. (Cl. 22—36)

Our invention relates to a method and apparatus for shell molding, or the forming of shell type molds or shell (hollow) cores in the foundry field.

One object of our invention is to provide a shell molding machine which produces rammed shell molds employing a new method for the production of such molds, the resulting shell molds being used in place of the usual drag and cope to provide a molding flask into which molten metal may be poured to form a casting of iron, steel, aluminum or the like, the shell cores when necessary being set in suitable cavities of the shell mold in order to produce metal castings of hollow cross section.

Another object of our invention is to provide apparatus in the form of a comparatively simple machine which minimizes the effort and time on the part of the operator to produce shell molds and shell cores at low cost and of superior quality.

Still another object is to provide a method and apparatus for shell molding which eliminates the cumbersomeness of operation of prior machines; eliminates the use of air pressure as a direct means to pack the investment (usually sand and a thermo-setting binder) into the mold cavity which has a tendency to separate the grains; eliminates the practice of introducing the sand from the top through a restricted opening which further segregates the fine sand grains from the coarse, thus producing an unstable core; eliminates the agitation of the investment against the heated surface of the mold box which produces soft spots in the shell mold and reduces its strength; and eliminates many other objectionable results of the prior machines.

A further object is to provide a combination of the controlled introduction of gas such as air to the investment in sufficient quantity only to "fluidize" it or segregate the sand grains only enough to make the investment fluid, and thereupon the mechanical displacement of the fluidized investment from an investment chamber and into the cavities of the mold box. The investment lies quietly against the molding surface of the mold box to facilitate solidification of the investment and subsequent curing thereof after the unsolidified investment is returned to the investment chamber.

Still a further object is to displace the investment in an upward direction from an investment chamber into the mold box thereabove and pack or ram it into the mold cavity therein (whether regular or irregular in shape) so that when the mold cavity is filled, the heated walls of the mold box begin a solidifying action on the adjacent investment causing a progressively deeper layer thereof to be solidified during an investment time period while the ram pressure is maintained and the desired shell mold wall thickness thereby attained, the displacement operation then being discontinued for allowing gravity flow of the remaining investment from the mold cavity. Thereupon the shell mold is left in contact with the heated surface of the mold box for a further curing time at the end of which the mold box may be opened and the shell mold removed.

An additional object is to provide means for evenly heating the investing surfaces of the mold box by the use of radiant heat to provide uniform consistency and wall thickness in the shell mold or shell core formed in our machine.

Another additional object is to provide an apparatus in which the shell mold can be cured in situ instead of having to be transferred from the mold box after the investment time period and then placed in a curing oven for a further period of time. We thus reduce the amount of handling of the shell mold.

Still another additional object is to provide a method in which investment fluidizing and ram forces under controlled conditions produce a superior shell mold or shell core with exceptionally smooth casting surfaces.

A further additional object is to provide an apparatus of the character disclosed which is particularly adapted as a "bench model" for small castings but may be manufactured in enlarged versions for large castings and as a floor model if desired.

With these and other objects in view, our invention consists in the construction, arrangement and combination of the various parts of our shell molding apparatus, and in the method disclosed whereby the objects above contemplated are attained, as hereinafter more fully set forth, pointed out in our claims and illustrated in detail on the accompanying drawings, wherein:

FIG. 1 is a front elevation of apparatus for shell molding in accordance with our invention showing mold boxes therein in the open position;

FIG. 2 is an end view of FIG. 1;

FIG. 3 is an enlargement of a portion of FIG. 1 with the mold boxes closed and an investment chamber in raised position, the machine thus being ready to perform a shell molding operation;

FIG. 4 is an enlarged view of a portion of FIG. 2 to show the investment chamber in the raised position;

FIG. 5 is a rear elevation of a portion of our molding machine to show investment and mold cylinders, and other elements of the apparatus;

FIG. 6 is a further enlarged vertical sectional view through the investment chamber taken on the line 6—6 of FIG. 4 and showing a diaphragm therein in the raised or investment displacing position;

FIG. 7 is a vertical sectional view through an assembly of shell mold and shell core, such as made in our apparatus, ready for the pouring of molten casting metal thereinto;

FIG. 8 is a vertical sectional view through a mold box for a shell core;

FIG. 9 is a horizontal section on the line 9—9 of FIG. 8;

FIG. 10 is similar to FIG. 8 but shows the mold box of FIG. 8 filled with investment;

FIG. 11 is similar to FIG. 10 but showing a layer of the investment solidified within the mold box and the remaining sand removed by gravity therefrom, whereby a shell core remains and may be cured and subsequently used in the assembly of FIG. 7;

FIG. 12 is a vertical sectional view through a mold box for a shell mold and is adaptable for forming a shell mold of the cross section indicated by dotted lines which is subsequently used as a shell mold in FIG. 7 in conjunction with the shell core of FIG. 11;

FIG. 13 is an electrical diagram showing the wiring hookup for electrically actuated control elements of our apparatus;

FIG. 14 is a diagram of a modification of FIG. 13;

FIG. 15 is a pneumatic diagram of other control elements of our apparatus; and

FIG. 16 is an enlarged vertical sectional view on the line 16—16 of FIG. 2 to illustrate the relationship between a radiant burner of our apparatus and the right-hand mold box in FIG. 1.

On the accompanying drawings we have used several reference characters to indicate certain control elements and the like, as listed below:

MS—main switch
LS—limit switch
IT—investment timer
CT—cure timer
FV—fluidizing valve
DV—diaphragm valve
IV—investment valve
MV—mold valve
IC—investment cylinder
MC—mold cylinder
$L^1$ and $L^2$—current supply lines
Bz—signal buzzer
Lt—signal light
Ex—exhaust (to atmosphere)
S—investment The above elements will be described in greater detail as the description of our apparatus proceeds.

Our apparatus is supported on a base plate 20 and column 22 which may be formed of boiler plate welded together to form a rigid supporting structure adaptable for mounting on a work bench or other suitable support. Within the column 22 a guide rod bracket 24 (see FIG. 1) is secured as by bolts 28. A pair of guide rods 26 are supported by the bracket 24 and extend from opposite sides of the column 22 as shown.

A pair of yoke-shaped carriage brackets 30 are slidable on the guide rods 26, and each is provided with an upper fork 32 and a lower fork 34. The forks 32 and 34 loosely receive the upper and lower ends of a square fixture shaft 36 projecting from the top and bottom of a flame guard 38 in the form of a rectangular frame bent from strap iron to provide upper, lower, and a pair of side walls. Slidably mounted on that portion of the fixture shaft 36 between the upper and lower walls of the flame guard 38 is an upper fixture bracket 40 and a lower fixture bracket 42 bolted to the lower wall of the flame guard 38.

A burner housing 44 is rigidly secured to each carriage bracket 30 by means of upper and lower bolts 46 threaded into holes of flanges 48 of the carriage brackets, and is so spaced relative to the flame guard 38 that there is a narrow air gap 45 between the two. A fixture latch 50 is pivoted on a pivot bolt 52 threaded into the burner housing 44.

Within the burner housing 44 we provide a radiant heater 54 (see FIG. 16) comprising a nozzle 56, a deflector 58, and a radiating element 60. The element 60 is formed of ceramic or the like, and is adapted to become incandescent when heated by a gas flame 57 from the nozzle 56. The element 60 radiates heat to a mold box 64 as indicated by arrows 59. Referring to FIGS. 3, 8 and 9, there are two mold box halves 62 and 64 and they have an investment receiving throat 63 adjacent a planar lower surface of the mold box.

The mold box halves are supported by the two carriage brackets 30 by means of upper and lower bolts 69 and 71 which bolt the halves to the upper and lower fixture brackets 40 and 42 respectively. The mold box halves 62 and 64 are shown separated or in the open position in FIG. 1, and are adapted to be moved to the closed position of FIG. 3 by the mold cylinder MC which, as shown in FIG. 15, is a double-acting cylinder having therein a piston 66 from which a piston rod 68 extends, and the upper end of the rod is pivoted to a rock lever 72 secured to a rock shaft 70.

Within the column 22, the rock shaft 70 is journalled in the guide rod bracket 24, and in front of the column 22 has secured thereto a second rock lever 74 connected by links 76 and 78 to the carriage brackets 30. The manner of connection comprises link blocks 80 pivoted to the links, and bolts 82 extended through slots 84 of the brackets 30 and threaded into the link blocks, whereby the distance between the brackets 30 in the closed position of the mold box halves 62 and 64 may be adjusted to accommodate mold box halves of different thicknesses.

As shown in FIG. 15, the mold valve MV is a 4-way valve (manually operated) for controlling the flow of actuating fluid such as compressed air from a supply pipe 86 selectively to opposite ends of the mold cylinder MC.

An investment chamber shown generally at 88 (see FIGS. 2, 3 and 4) is supported above the base 20 in front of the column 22 by means of a yoke 90 pivoted at 92 to the column 22 and provided with cylindrical abutments 94 located in seats 96 of the chamber. The yoke 90 has an arm 98 (see FIG. 5) extending within the column 22 and its terminal end is pivoted in a fork 99 on the lower end of a piston rod 100 extending from the investment cylinder IC as shown in FIGS. 5 and 15. The investment valve IV is a 3-way valve for admitting actuating fluid from the supply pipe 86 to the upper end of the cylinder IC, or for exhausting air therefrom, the lower end of the cylinder being vented to atmosphere at 104, and the weight of the investment chamber 88 returning the piston 102 from its lower position to its upper position when the valve IV is in the exhaust position shown in FIG. 15.

The investment chamber 88 shown in cross section in FIG. 6 is adapted to contain a supply of the investment S, such as sand and a thermo-setting binder as normally used in metal casting foundries. The investment S may be an admixture of sand and resin, or may be resin-coated sand, whereby heat applied thereto solidifies the investment for forming a shell mold or a shell core. The investment may be deposited in the open upper end of the chamber 88 when it is in the lowered position of FIG. 2 by means of a shovel or the like.

The bottom end of the chamber 88 is closed in by means of a diaphragm 106 and a diaphragm cover 108. The upper end of the chamber has a seal flange 110 adapted to seal against a gasket of rubber or the like 114 on the lower surface of a seal plate 112 when the mold box is closed and the investment chamber is raised as in FIG. 3. The upper surface of the seal plate 112 is provided with a heat resistant gasket 115 of asbestos, neoprene or the like, to engage the lower surfaces of the mold box halves 62 and 64 as shown in FIGS. 6, 8, 10 and 11. The seal plate has an opening 113 therethrough of suitable size and shape for the particular mold box 62—64 being used.

The space in the investment chamber 88 between the diaphragm 106 and the diaphragm cover plate 108 constitutes a diaphragm chamber 116 to which actuating fluid from the supply pipe 86 is controlled by means of the diaphragm valve DV as shown in FIG. 15, the valve DV being normally closed and of the solenoid-operated type so as to be opened by energization of the solenoid coil thereof in a well known manner. As shown in FIG. 6, the investment chamber 88 is provided with four fluidizing jets 118 communicating with an annular manifold groove 120 to which any suitable gas (such as air) is supplied through a fluidizing gas inlet 122. As shown in FIG. 15, such gas or air is controlled by the fluidizing valve FV of solenoid-operated type which is normally closed and is adapted to be opened by energization of its solenoid. As shown in FIGS. 1, 2 and 5, a fluidizing pressure regulator 124, diaphragm pressure regulator 126 and a gas pressure regulator 128 are advantageously provided for the proper control of fluidizing air, diaphragm pressure exerted on the investment S and gas pressure to the burners 54 respectively. An air valve 130 is also provided to control the flow of air into flexible hoses 132 leading to the burner nozzles 56 of the burners 54 for supplying them with a gas-air mixture for combustion therein. Suitable pressure gauges 124a, 126a and 128a are associated with the pressure regulators 124, 126 and 128 in the usual manner to determine the proper balance of pressures during the operation of our apparatus.

Referring to the electric diagram in FIG. 13, the main switch MS and the limit switch LS are in series to control the flow of current to the investment timer IT, the buzzer Bz, the fluidizing valve FV, the diaphragm valve DV, the cure timer CT and the pilot light Lt. The switch MS is a manual "on-off" switch to place the circuit in operation when it is desirable to operate the shell molding apparatus and to disable the electric circuit when the machine is out of use or when it is desirable to operate only the pneumatic portion thereof for test purposes without the machine going through its operating cycle.

The limit switch LS as shown in FIG. 5 is so located as to be operated by the outer end of the arm 98 in the fork 99 at the lower end of its movement which is the same as the completion of the lifting movement of the investment chamber 88. The limit switch LS is normally open, and upon being closed by raising of the investment chamber 88 starts the timers IT and CT operating, opens the valve FV and reverses the valve DV from the FIG. 15 position. The timer IT has a timer setting knob 154 and the timer CT has a similar knob 156 whereby the timers may be set for timing out for the desired investment time and cure time periods respectively. At the end of the timing period in the timer IT, the buzzer Bz is energized and the solenoid valves FV and DV are de-energized, whereupon the timer automatically resets.

The timer CT includes a holding circuit 158 to prevent the timer from being de-energized upon opening of the limit switch LS, and at the end of the timing period of the timer CT, it lights the light Lt and the timer is thereupon automatically reset.

The buzzer Bz and the pilot light Lt are signal devices operated at the end of the timing periods of the timers IT and CT respectively, and indicate to the operator of the apparatus that the investment valve IV is to be reclosed and the mold valve MV is to be reversed to its original position respectively, as will hereinafter appear.

FIG. 14 illustrates a modification wherein the valves IV and MV are manually moved from their normal positions against the bias of return springs 134 and 136, and latched in those positions by latches 138 and 140 respectively. The latches 138 and 140 may subsequently be automatically released by latch releasing magnets 142 and 144 substituted for the buzzer Bz and the pilot light Lt of FIG. 13, and under control of the respective timers IT and CT as illustrated.

*Practical Operation*

By way of example, we show in FIG. 7 an assembly of shell mold and shell core ready to receive molten metal through a pouring spout 148 and a sprue 146 into a casting space 150 to form a metal vase. The mold for the vase is formed by a shell core $S^1$ and a shell mold $S^2$—$S^3$, the parts $S^2$ and $S^3$ being the two halves of the shell mold which are secured together at their meeting faces by a suitable adhesive, or the two halves may be clamped together. The shell core $S^1$ is so shaped at the lower end as to interfit with the shell mold $S^2$—$S^3$ to properly position the shell core within the shell mold for uniform thickness of the casting space 150 in a well known manner. The assembly shown in FIG. 7 is illustrated as supported on a molding floor 152, and it will be obvious that the pouring of molten metal into the spout 148 will, upon completion of the filling of the mold, provide a cast metal base of the shape within the casting space 150.

Briefly, the shell core $S^1$ is formed by mounting the mold box halves 62 and 64 in the machine as shown in FIGS. 1, 3, 8 and 9 whereupon the central space within the mold box may be filled with investment S as in FIGS. 6 and 10 displaced by the diaphragm 106 from the investment chamber 88. The heat from the radiant burners 54 thereupon, during an investment period of time, solidifies a desired thickness of the investment S, whereupon the air under the diaphragm may be released through the diaphragm valve DV and the sand that is not solidified will flow by gravity (see arrow 89 is FIG. 11) back into the investment chamber 88 to be used subsequently in another mold box filling operation. The layer $S^1$ remaining in this figure constitutes a shell core to be used in the casting operation of FIG. 7 and is cured by remaining in the closed mold box 62—64 under the action of further radiant heat from the burners 54 for a curing time period. At the end of the curing time period, the mold box 62—64 is opened and the shell core $S^1$ will either remain supported on the seal plate 112 or cling to one of the mold box halves 62 or 64 from which it can be lifted and the operation repeated for forming a second shell core $S^1$ and so on.

Referring to FIG. 12, a mold box 162—164 is provided comparable to the mold box 62—64, and adapted for forming a shell mold as distinguished from a shell core. The shell mold in this instance is illustrated at $C^2$—$S^3$, and after it has been formed and removed from the machine, it is sawed in two vertically, whereupon the two halves of the shell mold are transposed, $S^3$ to the left and $S^2$ to the right as in FIG. 7, and the shell core $S^1$ associated therewith as illustrated to form the assembled mold already referred to. The shell core $S^1$ and the shell mold $S^2$—$S^3$ shown are, of course, for purposes of illustration only and the apparatus is adaptable to the production of shell cores and shell molds of all types and shapes.

In general the operation of our apparatus is such that the investment S is displaced from the investment chamber 88 in a mechanical manner (by physical movement of the diaphragm 106 into the chamber to displace the investment therefrom) and the movement of the diaphragm is illustrated as being controlled by compressed air. It is obvious, however, that the diaphragm could be hydraulically operated or the investment chamber 88 could be cylindrical in form and a piston substituted for the diaphragm, the piston being driven by a crank and connecting rod or any other mechanical driving means. The primary function of the investment chamber is to provide storage space for the investment S and means to move the investment out of such space and into the mold box.

We have found, however, that sand at rest in a chamber cannot be displaced upwardly therefrom without "fluidizing" the sand because the grains of sand tend to lock together and resist any displacing force. However, by injecting gas or air into the investment before attempting to displace it from the investment chamber, the sand is rendered freely flowable from the chamber and into the mold box 62—64 completely filling it under the predetermined pressure applied to the bottom of the diaphragm 106 as in FIGS. 6 and 10. Accordingly, a method for shell molding is involved, comprising in general the steps of fluidizing the investment and then displacing it from the investment chamber into the mold box, the fluidizing of the investment being an important step in the method to make practical the displacement of the investment against the force of gravity from the investment chamber and into the mold box, whereas subsequent release of the pressure under the diaphragm permits the excess sand from the shell core or shell mold to return by gravity into the investment chamber without the necessity of inverting the mold box or the chamber as in prior machines for shell molding operations.

We are aware that before our invention shell molding machines were provided wherein the investment is "blown" into the mold box by means of compressed air, but such machines require a relatively great volume of air and a plurality of relatively large vents from the cavity in the mold box into which the investment is blown. These vents must be as large as 3/16" or 1/4" in diameter and provided with screens to prevent the investment from being blown out through them, and the blowing action on the investment agitates it while the shell mold is being formed by the heat of the mold box to such an extent that the investment time period has to be somewhat extended relative to ours. Even then the shell mold wall is not as strong as produced in our machine because of the agitation of the investment due to the blowing action.

On the other hand, in our apparatus and method only a small volume of fluidizing air is introduced into the investment chamber and there is enough venting between the matching faces 67 of the mold box halves 62 and 64 (see FIGS. 8 and 9) which faces are formed as flat as possible and are held tightly together under the pressure of the mold cylinder MC and the toggle linkage 74—76—78 with the necessity of providing only a very small vent 65 shown in FIG. 8 that can be a mere "scratch" on one of the faces 67. The vent 65 is at the top of the mold box to insure ramming of the investment to the highest point therein or farthest from the opening 113 through the seal plate 112.

A practical operating sequence for our shell molding apparatus is provided by the control elements illustrated in FIGS. 13 and 15. The operating cycle of the apparatus includes the following steps after the mold box halves 62 and 64 are properly mounted and the proper seal plate 112 is provided:

(1) The mold valve MV is reversed from the position as shown in FIG. 15 to effect closure of the mold box.

(2) The investment valve IV is opened from the closed position of FIG. 15 to raise the investment chamber 88. At the completion of the stroke of the piston 102 in the investment cylinder IC, the arm 98 closes the limit switch LC to initiate step (3).

(3) Closure of the limit switch LS causes the investment timer IT and the cure timer CT to be energized to start their respective investment and cure timing periods, and simultaneously with the energization of the timer IT, the solenoid valves FV and DV are opened to admit fluidizing air to the investment chamber 88 and diaphragm actuating air to the diaphragm chamber 116 respectively.

Opening of the fluidizing valve FV admits air to the jets 118. Accordingly, the fluidizing air infiltrates the investment S to fluidize it.

Energization of the solenoid valve SV admits air to the diaphragm chamber 116. After the few seconds required for fluidizing the investment S, the diaphragm starts to rise from its normal position resting on the cover plate 108 and proceeds toward the position of FIG. 6, but does not close off the fluidizing jets 118 from which a trickle of fluidizing air keeps the investment in fluidized condition. Due to fluidization of the investment, it is readily displaced from the chamber 88 into the cavtiy within the mold box 62—64 as in FIGS. 6 and 10.

During the investment timing period (for instance 15 seconds) fluidizing pressure and the pressure of the diaphragm 106 are maintained on the entire body of the investment, both in the chamber 88 and in the mold box so that the investment material lies quiet and unagitated against the heated surfaces of the mold box. These surfaces are constantly heated by the radiant burners 54, and immediately start solidifying the layer of investment material next to them. As time proceeds, a progressively thicker layer is solidified and the desired thickness to form the shell $S^1$ of FIG. 11 is regulated by adjusting the timing period of the timer IT.

At the conclusion of the investment timing period, the solenoid valves FV and DV are de-energized so as to stop the flow of fluidizing air to the jets 118 and of diaphragm air to the diaphragm chamber 116.

Energization of the buzzer Bz is a signal to the operator to re-close the investment valve IV.

(4) The operator re-closes the valve IV in order to effect lowering of the investment chamber. As soon as the investment chamber starts to lower, the limit switch LS is opened but the holding circuit 158 for the timer CT maintains this timer energized until expiration of the cure time period (such as 45 seconds) whereupon the light Lt is energized to signal the operator to reverse the valve MV.

(5) Reversal of the valve MV to its initial position of FIG. 15 opens the mold box 62—64 to permit removal of the shell mold or shell core therefrom and the cycle is thereby completed. Another mold or core can then be immediately produced in the same mold box, or the mold box can be removed and one of another shape substituted.

To save change-over time and thus obtain maximum production from our shell molding machine, a pre-assembled second mold box with fixture shaft 36, flame guard 38 and fixture brackets 40 and 42 may be ready to substitute for the assembly just used, so that it is merely necessary to swing the latch 50 out of the way, then pull the assembly (62—64)—36—38—40—42 out of the forks 32 and 34 of the carriage bracket 30 and substitute the prepared assembly, latching it in position by means of the latch 50 so that the entire change-over period takes but a few seconds and the machine is immediately ready to form other shapes of shell molds or shell cores.

If the arrangement shown in FIG. 14 is used, the operation is somewhat more automatic, requiring only, on the part of the operator:

(1) Reversing the mold valve MV from the position shown in FIG. 14, and (2) Opening the valve IV from the closed position shown.

Upon the investment timer IT timing out, it energizes the latch releasing magnet 144 instead of the buzzer Bz as in FIG. 13, thus raising the latch 138 so that the valve IV is returned to its normal position by the return spring 134. Likewise, at the end of the cure time period, the timer CT energizes the latch release magnet 142 instead of energizing the light Lt as in FIG. 13, and the mold box will be opened automatically thus completing the cycle with only two instead of four operations required of the operator.

According to our present knowledge, either an admixture of sand and thermo-setting binder, or sand-coated with such binder, are suitable for mechanical displacement from the investment chamber 88 into the mold box cavity when the investment is fluidized as described. In most cases we find about 30 p.s.i. for the fluidizing air and 15 p.s.i. for the diaphragm pressure sufficient, but in operation (and depending on differences in the composition of the investment) either one of these pressures may be increased or decreased by proper adjustment of the pressure regulators 124 and 126, and the radiant heat from the burners 54 may be increased or decreased so as to strike a proper balance as between operating time, fluidity of the investment, the displacing pressure therefor, temperature and time variations (the latter by adjusting the knobs 154 and 156 of the timers IT and CT) in order to get maximum homogeneity and strength in the body of the shell mold or shell core, and surface quality and smoothness in the shell being produced in the apparatus. The operator quickly gains the necessary skill for making these adjustments and turning out shells that are of the best quality. Finished shell molds and shell cores requiring no cleanup are produced for use in one-half to one minute depending on size, wall thickness, etc., and the molding operations can be performed in rapid sequence.

It is possible that compositions of sand and thermo-setting binder may be developed that do not require fluidizing, in which case the fluidizing step of our method may be eliminated and only the displacing means such as the diaphragm 106 used to ram the investment into the mold cavity.

Whether the investment requires fluidizing or not, we have provided a method and apparatus for efficient ramming of the investment against the force of gravity into the mold cavity so that a shell mold or shell core can be formed during an investment period of time, whereupon the ramming pressure is released to permit gravity return of the surplus investment to the investment chamber, thus eliminating the roll-over operation required in some previous machines that use gravity and air blow to introduce the investment from above the mold box into the cavity thereof, and which thereafter require roll-over again to drain the excess investment back into the investment chamber. By mechanically ramming the investment into the mold box cavity, instead of blowing it thereinto, there is no agitation of the investment because of such blowing, whereas the fluidizing air being small in quantity and thus gentle in action permits the investment to lie quietly and under pressure from the diaphragm 106 against the heated surface of the mold box cavity to hasten set-up time and insure surface smoothness and the elimination of soft spots because of the absence of agitation. Our method and apparatus also eliminate vibration that disturbs the surface of the shell being formed. Because of the resulting good surface contact between the investment and the mold box cavity, smooth surfaces result for the casting eventually made in the shell mold and around the shell core so that close casting tolerances (within .002" to .003") can be held.

Our arrangement also provides for curing the shell mold or shell core in situ instead of the necessity of removing it from the mold box and transferring it to a curing oven. Our apparatus provides more uniform structure of high density and tensile strength in the shells and eliminates dust and segregation experienced with some types of shell molding equipment. In this connection high extrusion forces are exerted on the investment S in the chamber 88, and consequently the pressure with which the investment is rammed against the surfaces of the mold box are likewise high. By way of example—if the area of the diaphragm 106 is 100 sq. in. and the air is applied thereto at 30 p.s.i., then there is a 3,000 extrusion and ram force applied to the investment. By making the investment chamber cone-shaped and locating the diaphragm at the large end thereof, a relatively large area is had for a relatively small chamber, and efficiency of operation is also had in the action of the diaphragm as it bows upwardly under air pressure and effects expulsion of the investment through the relatively narrow neck of the chamber and into the mold cavity. In FIG. 1 the investment chamber is enclosed in a shroud 89 which has been broken away in FIG. 2.

From the foregoing specification it will be obvious that we have provided a comparatively simple apparatus to produce shell molds and shell cores of superior quality which apparatus is operated in accordance with a method that fluidizes the investment before it is mechanically rammed into the mold box cavity. Some changes may be made in the construction and arrangement of the parts of our apparatus for shell molding, and the method steps may be varied to some extent, without departing from the real spirit and purpose of our invention. It is accordingly our intention to cover by our claims any modified forms of structure, or use of mechanical equivalents or equivalent method steps which may reasonably be included within their scope.

We claim as our invention.

1. Shell molding apparatus comprising means for supporting the two halves of a mold box in face-to-face relation, radiant heating means for the back of each mold box half, an investment chamber continuously below said mold box and movable upwardly into sealed relation thereto, said investment chamber having means adjacent the bottom periphery thereof to admit a small quantity of compressed gas thereto sufficient only to fluidize investment in said investment chamber to permit it to be mechanically displaced therefrom and into the mold cavity of said mold box without agitation in the mold box, and diaphragm means movable upwardly into said investment chamber for effecting such displacement of such investment without agitating the same.

2. In shell molding apparatus, means for supporting the two halves of a mold box in intimate face-to-face relation, said mold box having a minute vent at the top thereof, heating means for the back of each mold box half, a cone-shaped investment chamber continuously below said mold box and movable upwardly into sealed relation thereto, the large end of said investment chamber being opposite said mold box and provided with a diaphragm movable upwardly into said investment chamber for effecting displacement of investment therefrom and into the mold cavity of said mold box, fluid pressure means to act on said diaphragm to cause such movement thereof into said investment chamber, and means for discharging air, sufficiently only to fluidize the investment, into said investment chamber adjacent the peripheral edge of said diaphragm, said diaphragm, upon movement upwardly into said cone-shaped chamber, contacting the wall thereof to assure continued discharge of fluidizing air to the investment only at the meeting line between the diaphragm and the chamber.

3. Apparatus of the character disclosed comprising means for supporting the two halves of a mold box and for opening and closing the same, heating means for each mold box half, an investment chamber below and movable into sealed relation to said mold box, said investment chamber having means to admit fluidizing air thereto adjacent the lower peripheral edge thereof to permit mechanical displacement of investment from said investment chamber and into the mold cavity of said mold box, fluid pressure actuated diaphragm means for effecting such displacement of such investment, said last means cooperating with the wall of said investment chamber to confine such fluidizing air to said wall in all positions of the diaphragm after it begins to move into said investment chamber whereby to minimize agitation of the investment in said mold box, fluid pressure means for closing and opening said mold box halves, fluid pressure means for raising said investment chamber, and timing means for timing an investment time period for the investment displaced into said mold box cavity by permitting return flow of investment from said mold box cavity by gravity into said investment chamber and a curing time period before the mold box is opened.

4. Shell molding apparatus comprising a pair of burners, means for supporting a pair of mold box halves having vent means of small size adjacent the top only thereof, one on each burner, each half being heated by its respective burner, a frame for supporting said burners for movement toward and away from each other, an investment chamber mounted on said frame and movable relative thereto into sealed relation with a mold cavity in said mold box, said investment chamber having means at the bottom thereof to admit fluidizing air to the investment therein, means in said chamber to reduce the volume thereof and thereby displace investment from said chamber and into the mold cavity of said mold box, said last means being effective to insure the admission of such fluidizing air always adjacent the lower peripheral edge of the body of investment in said investment chamber, a control element to move said burners and mold box halves toward each other to close the mold box, a second control element for moving said investment chamber into contact with said mold box, timer control means for admitting fluidizing air to said investment chamber and actuating fluid to said volume reducing means, and for terminataing the fluidizing air and retracting said volume reducing means, and a second timer control means for terminataing the mold closing operation whereupon the mold is opened for the removal of the shell therefrom.

5. Shell molding apparatus comprising a pair of burners, means for supporting a mold box half on each burner to be heated by its respective burner, a frame for supporting said burners for movement toward and away from each other, a cone-shaped investment chamber mounted on said frame with its large end down and movable upwardly relative thereto for engaging and sealing against the bottoms of said mold box halves when they are engaged with each other to provide a mold cavity, said investment chamber having means to admit fluidizing air to peripheral lower edge of the investment therein, means in said chamber to reduce the volume progressively upward from the bottom thereof and control the flow of fluidizing air so as to constantly cause it to be admitted to the peripheral lower edge of the investment while such volume is being reduced, thereby to displace fluidized investment from said chamber into the mold cavity without agitation of the investment in the mold box, a control element to move said burners and mold box halves toward each other to close the mold box, a second control element for elevating said investment chamber into contact with said mold box, investment timer control means for admitting fluidizing air to said investment chamber and actuating fluid to said investment displacing means, and for terminating the fluidizing air, retracting said volume reducing means and indicating termination of the investment chamber up period whereupon the investment chamber may be lowered, and cure timer control means for indicating termination of the mold closing operation whereupon the mold may be opened for the removal of the shell therefrom.

6. Apparatus for shell molding comprising means for supporting the two halves of a mold box having a minute vent at the top thereof in contacting face-to-face relation throughout their entire faces except at said vent, said means being pivoted for opening and closing movement, radiant heating means for the back of each mold box half, an investment chamber below said mold box and movable upwardly into sealed relation thereto, means to introduce a small quantity of fluidizing air into said investment chamber adjacent the lower periphery thereof, means movable into said investment chamber for effecting displacement of fluidized investment therefrom and into the mold cavity of said bold box, said last means being operable to confine such fluidizing air to the lower periphery of the body of investment in said investment chamber as said last means moves into said chamber, means to close said mold box, means to move said investment chamber upwardly, an investment time period timer and a cure time period timer, means to start said timers and effect introduction of fluidizing air and movement of said movable displacing means into said investment chamber upon completion of the upward movement of said investment chamber, said investment timer effecting discontinuance of the fluidizing air and retraction of said movable displacing means from said investment chamber at the completion of the investment time, means responsive to said investment timer timing out to disengage said investment chamber from said mold box at the completion of the investment time period, and means responsive to said cure timer timing out to open said mold box at the completion of the cure time period.

7. A method of shell molding comprising the steps of fluidizing investment in an investment chamber by the introduction of a small quantity of compressed gas to the peripheral bottom thereof sufficient only to fluidize the investment to permit it to be mechanically displaced from said investment chamber and into a minutely vented mold cavity of a heated mold box, mechanically displacing the fluidized investment from the investment chamber and into the mold cavity without agitation in said cavity by means of a diaphragm which reduces the effective size of the investment chamber, forming a shell which lines said heated mold cavity during an investment time period, and curing said shell during a further time period by the shell remaining in situ in said heated mold cavity.

References Cited in the file of this patent
UNITED STATES PATENTS

| | | |
|---|---|---|
| 2,538,770 | Fea | Jan. 23, 1951 |
| 2,588,669 | Taccone | Mar. 11, 1952 |
| 2,815,550 | Volyi | Dec. 10, 1957 |
| 2,820,998 | Harrison | Jan. 28, 1958 |
| 2,852,818 | Shallenberger | Sept. 23, 1958 |
| 2,856,653 | Sutter | Oct. 21, 1958 |
| 2,882,566 | Redhead | Apr. 21, 1959 |